US012111596B2

(12) United States Patent
Kim et al.

(10) Patent No.: US 12,111,596 B2
(45) Date of Patent: Oct. 8, 2024

(54) TRANSFER OF PRINTING MEDIUM IN SIMPLEX PATH AND DUPLEX PATH

(71) Applicant: Hewlett-Packard Development Company, L.P., Spring, TX (US)

(72) Inventors: Sangcheol Kim, Seongnam-si (KR); Jewon Jeong, Seongnam-si (KR); Wonkeun Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/030,332

(22) PCT Filed: Jun. 17, 2021

(86) PCT No.: PCT/US2021/037754
§ 371 (c)(1),
(2) Date: Apr. 5, 2023

(87) PCT Pub. No.: WO2022/076045
PCT Pub. Date: Apr. 14, 2022

(65) Prior Publication Data

US 2023/0367248 A1 Nov. 16, 2023

(30) Foreign Application Priority Data

Oct. 8, 2020 (KR) ........................ 10-2020-0130092

(51) Int. Cl.
*G03G 15/00* (2006.01)
*G03G 15/01* (2006.01)
*G03G 15/23* (2006.01)

(52) U.S. Cl.
CPC ..... *G03G 15/5008* (2013.01); *G03G 15/0105* (2013.01); *G03G 15/23* (2013.01); *G03G 2215/2083* (2013.01); *G03G 2215/2087* (2013.01)

(58) Field of Classification Search
CPC ........................ G03G 15/0105; G03G 15/5008
See application file for complete search history.

(56) References Cited

U.S. PATENT DOCUMENTS

2007/0166081 A1 7/2007 Omata et al.
2010/0276863 A1 11/2010 Yano
2011/0085838 A1 4/2011 Won
(Continued)

FOREIGN PATENT DOCUMENTS

CN 101875448 B 11/2012
CN 103287906 A 9/2013
JP 08-217290 A 8/1996

*Primary Examiner* — Walter L Lindsay, Jr.
*Assistant Examiner* — Andrew V Do
(74) *Attorney, Agent, or Firm* — Brooks, Cameron & Huebsch, PLLC

(57) ABSTRACT

An example image forming apparatus includes a simplex path for conveying printing medium passing through a fixing unit provided in a main body to a discharge port of the main body, a duplex path for turning over printing medium and conveying the printing medium to the simplex path, and a discharge unit for selectively conveying a first printing medium and a second printing medium in different directions, wherein the first printing medium includes an image formed on one surface passing through the simplex path, and the second printing medium includes an image formed on two surfaces and passing through the simplex path after passing through the duplex path.

14 Claims, 9 Drawing Sheets

(56) References Cited

U.S. PATENT DOCUMENTS

| | | | |
|---|---|---|---|
| 2013/0221596 | A1 | 8/2013 | Watanabe et al. |
| 2017/0017188 | A1 | 1/2017 | Ohtoshi et al. |
| 2018/0157200 | A1 | 6/2018 | Endoh et al. |
| 2019/0324396 | A1 | 10/2019 | Hayashi |
| 2020/0363763 | A1 | 11/2020 | Sakaguchi |

TRANSFER OF PRINTING MEDIUM IN SIMPLEX PATH AND DUPLEX PATH

BACKGROUND

An image forming apparatus is an apparatus that performs generating, printing, receiving, and transmitting of image data. The image forming apparatus using an electrophotographic method forms a visible toner image on a photoconductor by supplying toner to an electrostatic latent image formed on a photoconductor, transfers the toner image to a printing medium directly or through an intermediate transfer medium, and fixes the transferred toner image on the printing medium.

As environmental issues emerge around the world, the usage of double-sided printing is increasing to reduce the usage of printable media.

Figure 1:
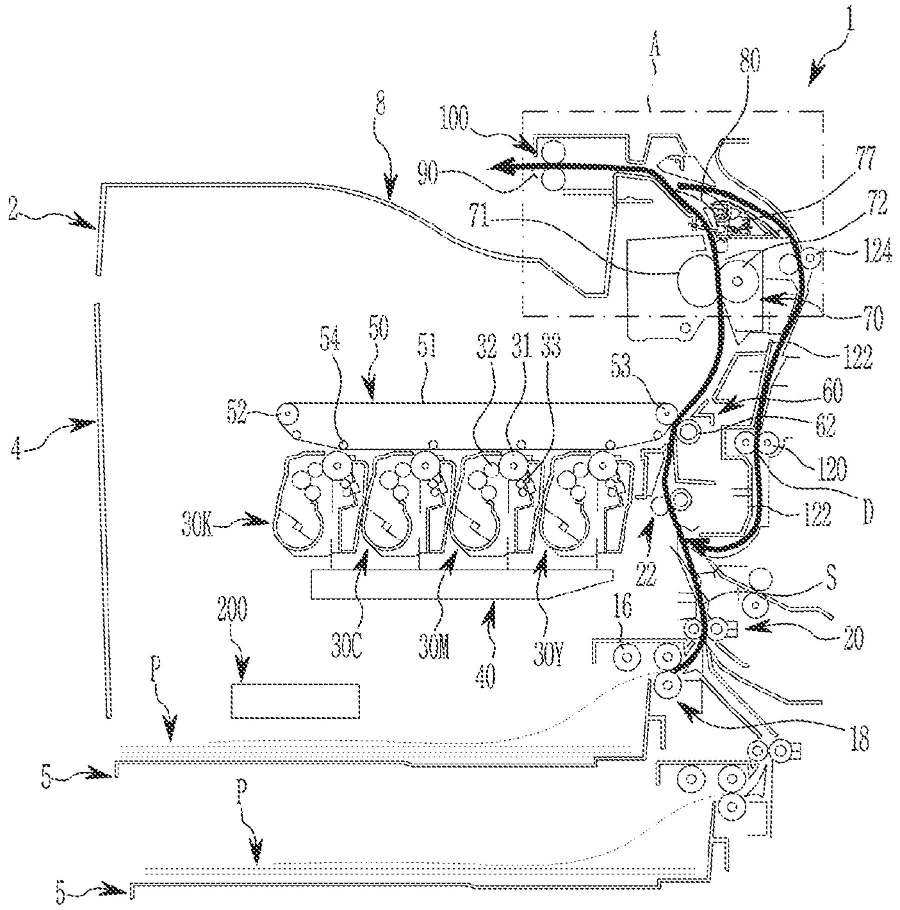
FIG. 1 is a schematic cross-sectional view of an image forming apparatus according an example.

It should be understood that the above-referenced drawings are not necessarily to scale. Various design features of the present disclosure, including, for example, specific dimensions, orientations, locations, and shapes, may be determined in part by the particular intended application and use environment.

DETAILED DESCRIPTION OF EXAMPLES

When performing double-sided printing in an image forming apparatus such as a printer, interference between printable media should be prevented. Various methods can be used to prevent interference between printable media.

For example, the double-sided printing may be implemented by forming a simplex path for forming an image on one surface of a printing medium, a duplex path and a return path for turning over the printing medium with the image formed on one surface, and a discharge path for discharging the printing medium with the image formed on both surface to the outside of the image forming apparatus. However, since complicated paths must be formed inside a main body, the overall size of the image forming apparatus becomes large, and many parts must be used.

Alternatively, in the case of forming images on both surfaces of the printing medium through only the simplex path and the duplex path, since only one sheet may exist in each path, the discharging efficiency of the printing medium may be significantly deteriorated.

To address these problems, an example discharge unit may selectively convey a first printing medium and a second printing medium in different directions. Here, the first printing medium is a printing medium on which the image is formed on one surface passing through the simplex path, and the second printing medium is a printing medium on which the image is formed on the other surface passing through the simplex path after passing through the duplex path. Therefore, although two sheets of printable media exist in the discharge port, one sheet of the printing medium may be discharged to the outside and the other sheet of the printing medium may be conveyed to the duplex path. Therefore, the discharging efficiency of the printing medium may be improved.

The terminology used herein is for the purpose of describing various examples and is not intended to be limiting of the present disclosure. As used herein, the singular forms “a,” “an,” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. The term “coupled” denotes a physical relationship between two components, whereby the components are either directly connected to one another or indirectly connected via one or more intermediary components.

Additionally, it is understood that one or more of the below methods or aspects thereof may be implemented by at least one controller. The term “controller” may refer to a hardware device that includes a memory and a processor. The memory is to store program instructions, and the processor is programmed to execute the program instructions to perform one or more example processes which are described below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, a controller of the present disclosure may be embodied as non-transitory computer readable media containing executable program instructions executed by a processor. Examples of the computer readable media include, but are not limited to, ROM, RAM, compact disc (CD)-ROMs, magnetic tapes, floppy disks, flash drives, smart cards, and optical data storage devices.

Hereinafter, an example image forming apparatus will be described with reference to the accompanying drawings.

FIG. 1 is a schematic cross-sectional view of an image forming apparatus according to an example.

The image forming apparatus according to an example may support a simplex mode and a duplex mode.

The simplex mode refers to an image forming mode in which an image is formed only on one surface of a printing medium P. That is, if the image forming apparatus according to an example is operated once, the image forming apparatus forms an image on one surface of the printing medium P and discharges the printing medium P.

The duplex mode refers to an image forming mode in which an image is formed on both surfaces of a printing medium P. That is, if the image forming apparatus according to an example is operated once, the image forming apparatus forms an image on one surface of the printing medium P, turns over the printing medium P, and forms an image on the opposite surface of the printing medium P.

As shown in FIG. 1, an image forming apparatus 1 may include a main body 2, and at least one cassette 5 detachably mounted in a lower portion of the main body 2 and capable of supplying the printing medium P to the main body 2.

The main body 2 may have a rectangular pillar shape having a space formed therein, and a cover 4 may be provided at one side surface of the main body 2. The cover 4 can be hinged to the one side surface of the main body 2 so that a part of the main body 2 can be opened or closed by rotation of the cover 4. When the cover 4 opens, parts of the image forming apparatus 1 can be repaired or replaced.

A printing medium output tray 8 is provided at the main body 2, and the printing medium P on which an image is formed by the image forming apparatus 1 is discharged to the printing medium output tray 8. In addition, a discharge port 90 for discharging the printing medium P on which the image forming is completed is provided at a side of the printing medium output tray 8.

The image forming apparatus 1 may include a plurality of developing units 300, 30M, 30Y, and 30K, an exposure unit 40, a transfer device 50 and 60, and a fixing unit 70 in the main body 2.

The plurality of developing units 300, 30M, 30Y, and 30K can develop an electrostatic latent image into a visible image through a developer (e.g., a toner). In an example, the plurality of developing units 30C, 30M, 30Y, and 30K may include four developing units 30C, 30M, 30Y, and 30K, each storing any one of developers of cyan C, magenta M, yellow Y, and black K to develop any one of the images of cyan C, magenta M, yellow Y, and black K. The four developing units 30C, 30M, 30Y, and 30K are arranged in parallel with one another beneath the transfer device 50 and 60.

Each of the developing units 300, 30M, 30Y, and 30K includes a photosensitive drum 31, a developing roller 32, and a charging roller 33. The photosensitive drum 31 is an example of a photoconductor on which an electrostatic latent image is formed, and may include a photosensitive layer on an exterior circumference thereof. The charging roller 33 is an example of a charger that charges a surface of the photosensitive drum 31 with a uniform electric potential, and a charging bias voltage is applied to the charging roller 33. The developing roller 32 supplies the developer to the electrostatic latent image formed on the surface of the photosensitive drum 31 to develop the electrostatic latent image. When a developing bias voltage is applied to the developing roller 32, the developer is moved and attached to the electrostatic latent image formed on the surface of the photosensitive drum 31.

The exposure unit 40 irradiates light including image information to each photosensitive drum 31 provided at each developing unit 30C, 30M, 30Y, or 30K to form the electrostatic latent image on the surface of each photosensitive drum 31.

The transfer device 50 and 60 receives the printing medium P from the cassette 5 and transfers the visible image formed on the photosensitive drum 31 to the printing medium P. The transfer device 50 and 60 includes a first transfer unit 50 onto which the visible image is formed by the developers from the developing units 300, 30M, 30Y, and 30K, and a second transfer unit 60 to transfer the visible image on the first transfer unit 50 to the printing medium P.

The first transfer unit 50 includes a transfer belt 51. The transfer belt 51 is an intermediate transfer media, and the developers developed on the photosensitive drums 31 of the developing units 30C, 30M, 30Y, and 30K in the form of the visible image are transferred in an overlapped manner to the transfer belt 51. The first transfer unit 50 further includes a driving roller 52 and a driven roller 53, disposed at respective sides of the transfer belt 51 to rotate the transfer belt 51, and a plurality of rollers 54 disposed opposite to the photosensitive drums 31 of the developing units 30C, 30M, 30Y, and 30K with the transfer belt 51 interposed therebetween to transfer the visible image formed on the photosensitive drums 31 to the transfer belt 51. The rollers 54, the driving roller 52, and the driven roller 53 are rotatably mounted on a transfer belt frame (not shown). The first transfer unit 50 according to an example includes the transfer belt 51, but the first transfer unit 50 according to another example may include a photoconductive drum (not shown).

The second transfer unit 60 may include a transfer roller 62. The transfer roller 62 is positioned opposite to the driven roller 53, and the transfer belt 51 is positioned between the transfer roller 62 and the driven roller 53. A transfer bias voltage is applied to the transfer roller 62 to transfer the visible image developed on the surface of the transfer belt 51 to the printing medium P. If the first transfer unit 50 includes the photoconductive drum, the transfer roller 62 may be positioned opposite to the photoconductive drum.

The visible image transferred to a surface of the printing medium P by the transfer roller 62 is maintained on the surface of the printing medium P due to electrostatic attraction. The fixing unit 70 forms a permanent image on the printing medium P by applying heat and pressure to the visible image to fix the visible image on the printing medium P. The fixing unit 70 includes a heating roller 71 for generating heat, and a pressure roller 72 having an external circumferential surface made of an elastically deformable material to press the printing medium P against the external circumferential surface of the heating roller 71.

The image forming apparatus 1 according to an example includes a plurality of conveying devices in the main body 2, which supply the printing medium P loaded in the cassette 5 sequentially to the transfer device 50 and 60 and the fixing unit 70 to form the image on the printing medium P and discharge the printing medium P on which the image is formed to the printing medium output tray 8. The plurality of conveying devices may include a pickup roper 16, a retard roller 18, a feed roller 20, a register roller 22, and a discharge unit 100.

The pickup roller 16 picks up the printing medium P loaded on the cassette 5. The retard roller 18 conveys the printing medium P picked up by the pickup roller 16 to the feed roller 20 sheet by sheet. If the pickup roller 16 picks up multiple sheets of printable media P, a pair of retard rollers 18 rotating in opposite directions to each other convey the printing medium P to the feed roller 20 sheet by sheet. The feed roller 20 guides the printing medium P picked up by the pickup roller 16 to the transfer device 50 and 60, and the register roller 22 disposed between the feed roller 20 and the transfer device 50 and 60 aligns a front end of the printing medium P and feeds the printing medium P to the transfer device 50 and 60. The discharge unit 100 is disposed near the discharge port 90 to discharge the printing medium P on which the image is completely formed to the printing medium output tray 8.

In the simplex mode, the printing medium P passes sequentially through the pickup roller 16, the retard roller 18, the feed roller 20, the register roller 22, the transfer device 50 and 60, the fixing unit 70, and the discharge unit 100. Here, a path of the printing medium P passing sequentially through the pickup roller 16, the retard roller 18, the feed roller 20, the register roller 22, the transfer device 50 and 60, the fixing unit 70, and the discharge unit 100 is referred to as a simplex path S.

In an example, the image forming apparatus 1 can support the duplex mode. For this purpose, the image forming apparatus 1 includes a guider 80, at least one duplex roller 124, and at least one duplex frame 122.

The guider 80 may be mounted between the fixing unit 70 and the discharge unit 100 with respect to the simplex path S of the printing medium P. The guider 80 may be rotated between a first position and a second position by a control signal of a controller 200. Here, the first position refers to a position in which the guider 80 can guide the printing medium P passing through the fixing unit 70 toward the discharge unit 100, and the second position refers to a position in which the guider 80 can block the simplex path S and guide the printing medium P in the discharge unit 100 to the duplex roller 124.

The at least one duplex roller 124 is disposed on an opposite side of the simplex path S with respect to the guider 80 and the at least one duplex frame 122. The at least one duplex roller 124 is to convey the printing medium P to the register roller 22.

The at least one duplex frame 122 functions as a guide of the printing medium P in the discharge unit 100 to the duplex roller 124 and guides the printing medium P passing the duplex roller 124 to the register roller 22. The number and shape of the at least one duplex frame 122 can be designed as a number and shape suitable for guiding the printing medium P to the register roller 22 through the duplex roller 124.

Figure 2:
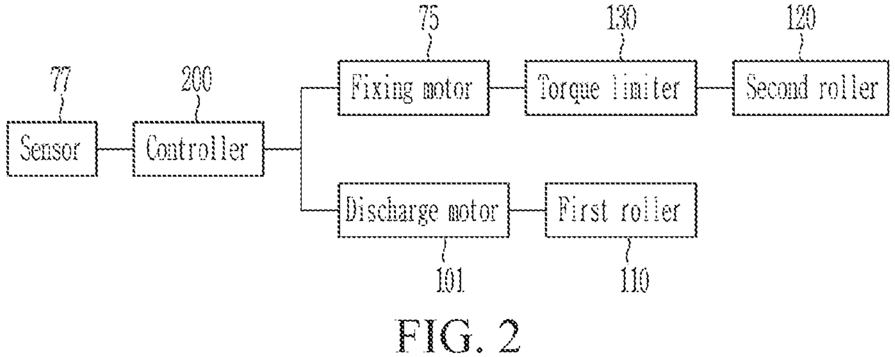
FIG. 2 is a block diagram of an image forming apparatus according to an example.

FIG. 2 is a block diagram of an image forming apparatus according to an example.

Referring to FIG. 2, the image forming apparatus 1 may include a sensor 77 for detecting the printing medium P passing the fixing unit 70. The sensor 77 may be disposed at an appropriate position on the simplex path S. In an example, the sensor 77 may be an optical sensor that detects light reflected from the printing medium P by irradiating light onto the simplex path S.

The controller 200 may convert the rotation direction of a discharge motor of the discharge unit 100 based on the signal transmitted from the sensor 77 to change the rotation direction of the first roller, which will be described later, and adjust the transfer direction of the printing medium P.

An example image forming process by the image forming apparatus 1 in the duplex mode will be briefly described. When image forming in the duplex mode is instructed by a user, the pickup roller 16 picks up the printing medium P with a first surface facing upward, and the retard roller 18, the feed roller 20, and the register roller 22 feed the printing medium P between the transfer roller 62 and the transfer belt 51. At this time, since the first surface of the printing medium P contacts the transfer belt 51, the visible image is transferred to the first surface. The visible image transferred to the first surface of the printing medium P is fixed to the printing medium P by receiving heat and pressure from the fixing unit 70, thereby completing the image forming on the first surface. In addition, the printing medium P passes through the discharge unit 100 by the guider 80 positioned at the first position. At this time, the first surface of the printing medium P is facing downward.

The controller 200 rotates the discharge unit 100 in an opposite direction to convey the printing medium P back to the guider 80 at a time from a point when the front end of the printing medium P passes through the discharge unit 100 reaches a predetermined time. At this time, the controller 200 prevents the printing medium P discharged from the discharge unit 100 from being conveyed back to the simplex path S by positioning the guider 80 at the second position, and guides the printing medium P to the guider 80, the duplex roller 124, and the duplex frame 122. The duplex roller 124 and the duplex frame 122 convey the printing medium P back to the register roller 22. The register roller 22 feeds the printing medium P between the transfer roller 62 and the transfer belt 51 again. At this time, since a second surface of the printing medium P opposite to the first surface contacts the transfer belt 51, the visible image is transferred onto the second surface. The visible image transferred onto the second surface of the printing medium P is fixed onto the printing medium P by receiving heat and pressure from the fixing unit 70. Therefore, the image forming on the second surface is completed. The printing medium P passes through the discharge unit 100 by the guider 80 positioned at the first position and is discharged to the printing medium output tray 8.

In the duplex mode, the printing medium P reaches the discharge unit 100 after sequentially passing through the pickup roller 16, the retard roller 18, the feed roller 20, the register roller 22, the transfer device 50 and 60, the fixing unit 70, and the guider 80 along the simplex path S. Thereafter, the printing medium P is conveyed back to the register roller 22 through the guider 80, the duplex roller 124, and the duplex frame 122. Here, a path of the printing medium P conveyed to the register roller 22 through the discharge unit 100, the guider 80, the duplex roller 124, and the duplex frame 122 is referred to as a duplex path D.

Figure 3:
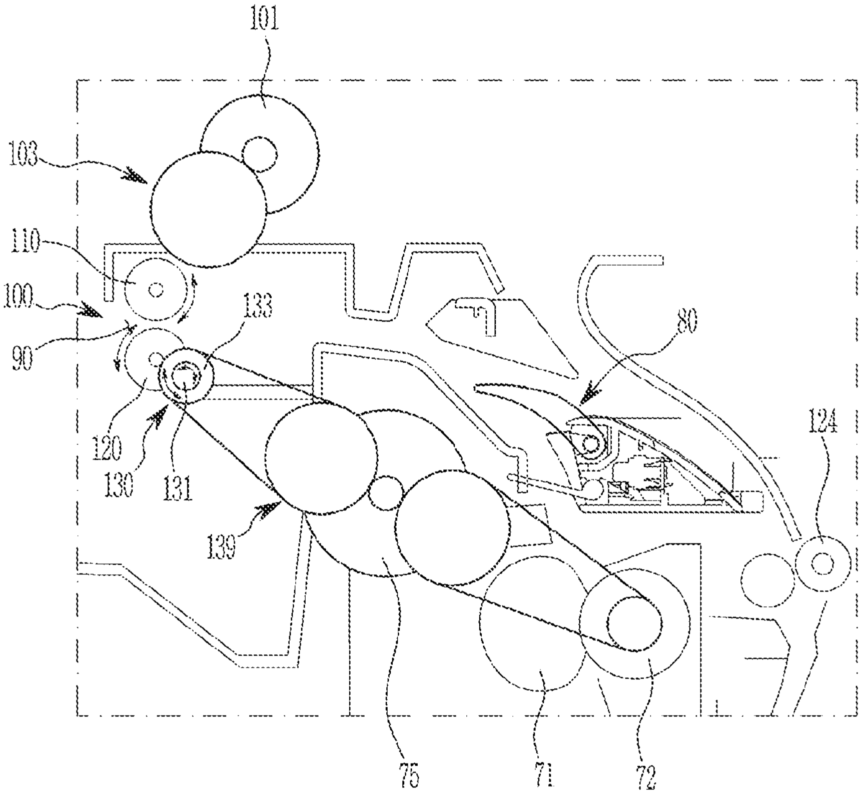
FIG. 3 is a cross-sectional view of a discharge unit according to an example.

FIG. 3 is a cross-sectional view of a discharge unit according to an example, FIG. 3 is an enlarged view of box 'A' of FIG. 1.

Referring to Fla 3, the discharge unit 100 discharges the printing medium P to the discharge port 90 transferred from the simplex path S, or conveys the printing medium P transferred from the simplex path S to the duplex path D. The image forming apparatus 1 may perform an operation of discharging the printing medium P on which the image forming is completed to the discharge port 90 and an operation of conveying the printing medium P in order to turn it over through the discharge unit 100 provided at the discharge port 90. To this end, the discharge unit 100 may convey the printing medium P with an image formed on one surface passing through the simplex path S and the printing medium P with the image formed on the other surface passing through the simplex path S after passing through the duplex path D in different directions, Here, the different directions may include a direction in which the printing medium P is discharged to the discharge port 90 from the simplex path S and a direction in which the printing medium P is conveyed to the duplex path D from the simplex path S.

To this end, the discharge unit 100 includes a first roller 110 rotated by a discharge motor 101 and a second roller 120 positioned opposite to the first roller 110. When the printing medium P is not inserted between the first roller 110 and the second roller 120, the first roller 110 and the second roller 120 are engaged with each other and rotated. The discharge motor 101 is a motor capable of supplying power to the first roller 110 while rotating in both directions (e.g., clockwise and counterclockwise), and the first roller 110 is rotated in a first direction (e.g., clockwise) and a second direction (e.g., counterclockwise) according to the rotation direction of the discharge motor 101. When the first roller 110 is rotated in the first direction, the printing medium P moves to the discharge port 90 from the simplex path S, and when the first roller 110 is rotated in the second direction, the printing medium P moves to the duplex path D from the discharge port 90.

The discharge motor 101 and the first roller 110 may be connected through a reduction device (e.g., a reduction gear, a belt, etc.) 103. The rotation direction of the discharge motor 101 may be converted to the second direction from the first direction and vice versa by control of the controller 200.

The second roller 120 is provided to rotate in the same or opposite direction to the first roller 110. For this purpose, the second roller 120 may be rotatably connected to a torque limiter 130.

Figure 4:
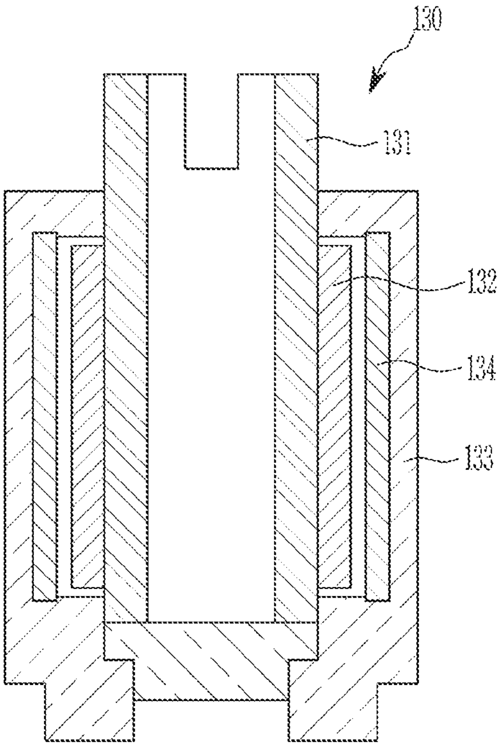
FIG. 4 is a cross-sectional view of a torque limiter according to an example.

FIG. 4 is a cross-sectional view of a torque limiter according to an example.

Referring to FIG. 4, the torque limiter 130 may include an inner race 131 (or first rotation body) rotated in one direction and an outer race 133 (or second rotation body) provided in a radially exterior direction of the inner race 131. The outer race 133 may be rotatably connected to the second roller 120, and the inner race 131 may be connected to a fixing motor 75 through a reducer 139 (e.g., a belt).

An inner magnet 132 (or first magnet) may be provided in an exterior circumference of the inner race 131 of the torque limiter 130 and an outer magnet 134 (or second magnet) may be provided in an interior circumference, thereby generating an operation torque by a magnetic force between the inner magnet 132 and the outer magnet 134. For example, when the inner magnet 132 and the outer magnet 134 have opposite polarities, the operation torque may be generated by the attractive force between the inner magnet 132 and the outer magnet 134.

Therefore, when an external force is not applied to the outer race 133 or an external torque applied to the outer race 133 is less than the operation torque, the inner race 131 and the outer race 133 are integrally rotated (i.e., the inner race 131 and the outer race 133 rotate in the same direction) by the attractive force between the inner magnet 132 and the outer magnet 134.

On the contrary, when the external torque applied to the outer race 133 is greater than the operation torque, the outer race 133 is rotated in the opposite direction to the inner race or stopped.

Figure 5:
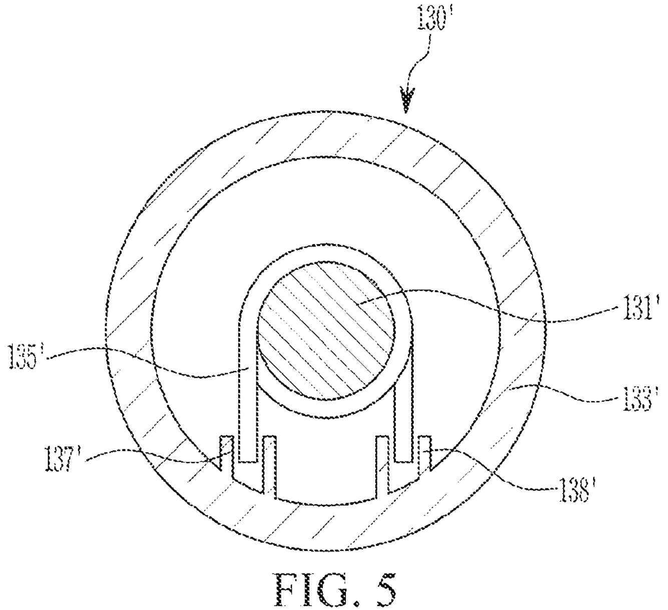
FIG. 5 is a cross-sectional view of a torque limiter according to an example.

FIG. 5 is a cross-sectional view of a torque limiter according to an example.

Referring to FIG. 5, a torque limiter 130' includes an inner race 131' (or first rotation body) rotated in one direction and an outer race 133' (or second rotation body) provided in a radially exterior direction of the inner race 131'. The outer race 133' may be rotatably connected to the second roller 120, and the inner race 131' may be connected to the fixing motor 75 through a reducer 139 (e.g., a belt).

A spring 135' may be disposed between the inner race 131' and the outer race 133' of the torque limiter 130', and the operation torque may be generated by an elastic force of the spring 135'. The spring 135' may be a coil spring. In an example, one end of the spring 135' is hooked to a first protrusion 137' formed in an interior circumference of the outer race 133' and the other end of the spring 135' is hooked to a second protrusion 138' formed in an interior circumference of the outer race 133', thereby generating the elastic force of the spring 135' between the inner race 131' and the outer race 133'.

For example, one end of the spring 135' may be hooked to the first protrusion 137' formed in an interior circumference of the outer race 133', and the other end of the spring 135' may be hooked to the second protrusion 138' formed in an interior circumference of the outer race 133'. At this time, the spring 135' may be wound around the inner race 131' in a direction that tightens the inner race 131' so as to rotate integrally with the inner race 131'.

Therefore, when the inner race 131' is rotated, the operation torque is generated by the elastic force applied to one end and the other end of the spring 135' hooked to the first protrusion 137' and the second protrusion 138', and the inner race 131' is integrally rotated with the outer race 133'. However, when the external force is applied to the outer race 133' in an opposite direction to the rotational direction of the inner race 131', the diameter of the spring 135' becomes larger than the exterior diameter of the inner race 131' by an external force applied to the one end of the spring 135' hooked to the first protrusion 137' and the other end the spring 135' hooked to the second protrusion 138'.

Therefore, the inner race 131' is not integrally rotated with the outer race 133', and the outer race 133' is rotated in the opposite direction to the rotational direction of the inner race 131' or stopped.

As such, when the external force is not applied to the outer race 133' or the external torque applied to the outer race 133' is less than the operation torque, the inner race 131' is integrally rotated with the outer race 133' (or the inner race 131' and the outer race 133' are rotated in a same direction).

On the contrary, when the external torque applied to the outer race 133' is greater than the operation torque, the outer race 133' is rotated in the opposite direction to the inner race 131' or stopped.

Figure 6:
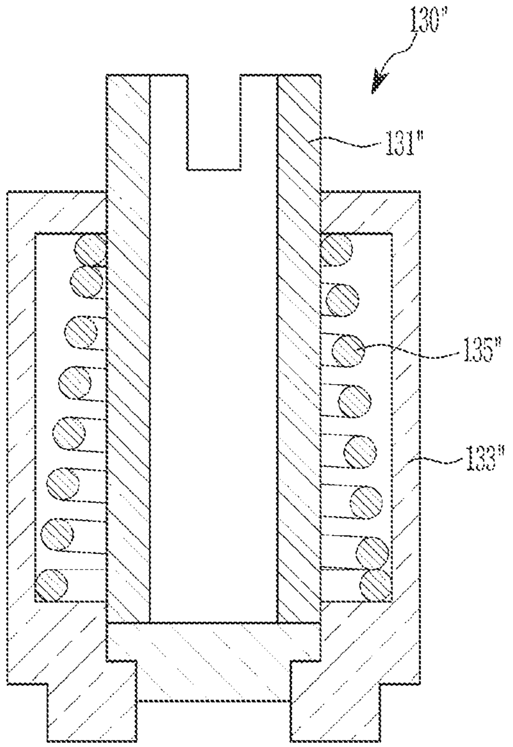
FIG. 6 is a cross-sectional view of a torque limiter according to an example.

FIG. 6 is a cross-sectional view of a torque limiter according to an example.

Referring to FIG. 6, a torque limiter 130" includes an inner race 131" (or first rotation body) rotated in one direction and an outer race 133" provided in a radially exterior direction of the inner race 131". The outer race 133' may be rotatably connected to the second roller 120, and the inner race 131" may be connected to the fixing motor 75 through the reducer 139 (e.g., a belt).

A spring 135" may be disposed between the inner race 131" and the outer race 133" of the torque limiter 130", and the operation torque may be generated by an elastic force of the spring 135". The spring 135" may be a coil spring.

In an example, one end of the spring 135" may be fixedly installed to the inner race 131" and the other end may be a free end. The spring 135" may be wound so that the diameter of the spring increases corresponding to the rotational direction of the inner race 131". That is, if the inner race 131" is rotated, then the diameter of the other end of the spring 135" increases and comes in contact with an interior circumference of the outer race 133'. Therefore, the operation torque is generated by the elastic force of the spring 135".

Accordingly, when the external force is not applied to the outer race 133' or the external torque applied to the outer race 133' is less than the operation torque, the diameter of the spring 135" increases by the rotation of the inner race 131" and the other end of the spring 135" comes in contact with the interior circumference of the outer race 133'. Therefore, the inner race 131' and the outer race 133' are integrally rotated (or the inner race 131" and the outer race 133" are rotated in the same direction).

On the contrary, when the external torque applied to the outer race 133' is greater than the operation torque, the other end of the spring 135" is separated from the interior circumference of the outer race 133", and the outer race 133" is rotated in the opposite direction to the inner race 131" or stopped.

In an example, it has been described that one end of the spring 135' is fixedly installed to the inner race 131" and the other end of the spring 135" is the free end. However, this is to be understood as an example and it may be implemented in reverse.

Referring back to FIG. 3, the fixing motor 75 may operate the pressure roller 72 of the fixing unit 70. The fixing motor 75 may rotate in one direction (i.e., a direction in which the printing medium P is moved from the simplex path to the discharge port 90). Accordingly, the inner race 131 of the torque limiter 130 connected to the fixing motor 75 is provided to always rotate in one direction (e.g., clockwise) by the rotation of the fixing motor 75.

Therefore, the inner race 131 of the torque limiter 130 is always rotated in one direction by the fixing motor 75. In an example, the inner race 131 of the torque limiter 130 may always rotate clockwise. When the external torque is not applied to the outer race 133 of the torque limiter 130 or the external torque applied to the outer race 133 is less than the operation torque (or when the external torque is not applied to the second roller or the external torque applied to the second roller is less than operation torque), the outer race 133 is rotated together with the inner race 131 (e.g., clockwise), and the second roller 120 connected to the outer race 133 is rotated counterclockwise.

Hereinafter, an example operation of an image forming apparatus in the duplex mode will be described with reference to accompanying drawings.

First, an example is which the printing medium P is discharged to the discharge port 90 in the simplex mode and the printing medium P is conveyed to the duplex path D from the discharged port 90 through one discharge unit 100 of the image forming apparatus will be described.

According to an example, the rotational direction of the second roller 120 is converted according to a number of printing medium P sheets interposed between the first roller 110 and the second roller 120.

Figure 7:
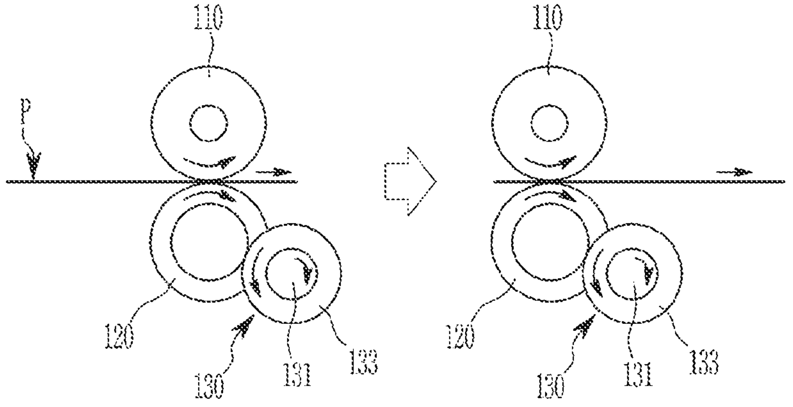
FIG. 7 and FIG. 8 are drawings for explaining a principle of transferring a printing medium according to an example.
Figure 8:
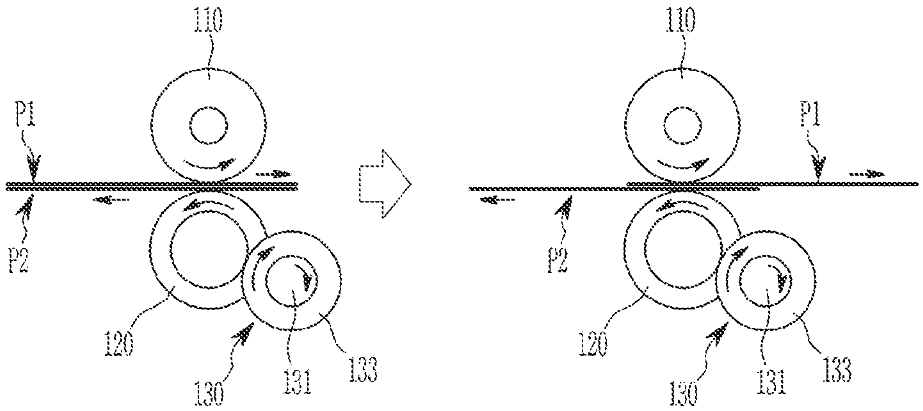

FIG. 7 and FIG. 8 are drawings for explaining a principle of transferring a printing medium according to an example.

Referring to FIG. 7, when the printing medium P is not interposed between the first roller 110 and the second roller 120 or one sheet of printing medium P is interposed between the first roller 110 and the second roller 120, a friction coefficient between the first roller 110 and the second roller 120 or a friction coefficient between the second roller 120 and the printing medium P is large. Accordingly, the external torque applied to the outer race 133 of the torque limiter 130 connected to the second roller 120 is greater than the operation torque of the torque limiter 130, and thus the second roller 120 is rotated in conjunction with the first roller 110. Here, the external torque may be determined by a pressure applied between the first roller 110 and the second roller 120, the friction coefficient between the first roller 110 and the second roller 120 or between the second roller 120 and the printing medium P, and a radius of the second roller 120. That is, the second roller 120 is rotated in the opposite direction to the rotational direction of the first roller 110. Therefore, in relation to the orientation of the figure, the printing medium P interposed between the first roller 110 and the second roller 120 moves toward the right from the left according to the rotational direction of the first roller 110. At this time, the outer race 133 of the torque limiter 130 is rotated in the opposite direction to the inner race 131.

Referring to FIG. 8, when two sheets of printable media P are interposed between the first roller 110 and the second roller 120, since the friction coefficient between the first roller 110 and the printing medium P or between the second roller 120 and the printing medium P is greater than the friction coefficient between the two sheets of printable media P, slip between the two sheets of printable media P is generated. Accordingly, the external torque applied to the outer race 133 of the torque limiter 130 connected to the second roller 120 is less than the operation torque of the torque limiter 130, and thus the second roller 120 is rotated by the toque of the fixing motor 75 connected to the inner race 131 regardless of the first roller 110. That is, the second roller 120 is rotated in the same direction as the first roller 110. Thereby, in relation to the orientation of the figure, the printing medium P1 in contact with the first roller 110 moves to the right from the left according to the rotational direction of the first roller 110, and the printing medium P2 in contact with the second roller 120 moves to the left from the right according to the rotational direction of the second roller 120. At this time, the outer race 133 of the torque limiter 130 is rotated in the same direction to the inner race 131.

Figure 9:
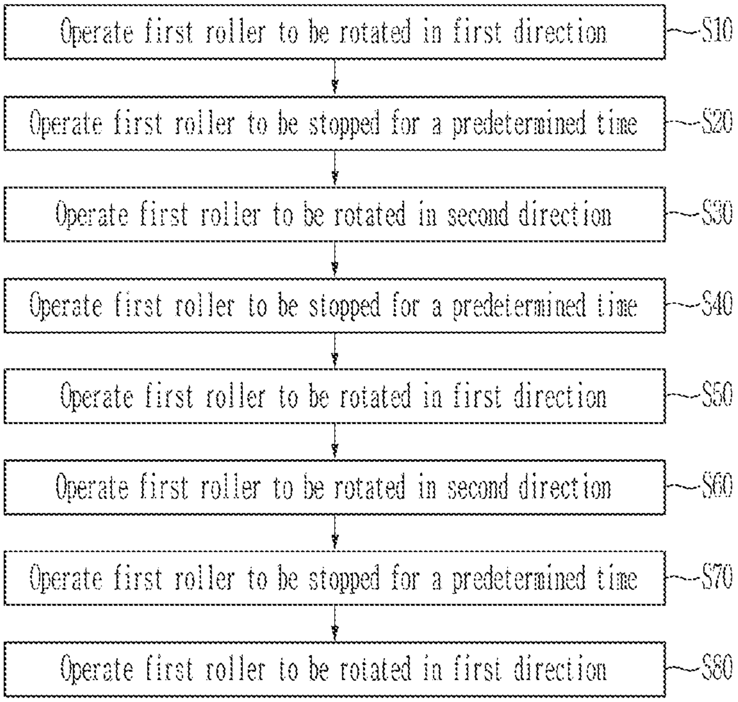
FIG. 9 is a flowchart illustrating a method of controlling an image forming apparatus according to an example.
Figure 10:
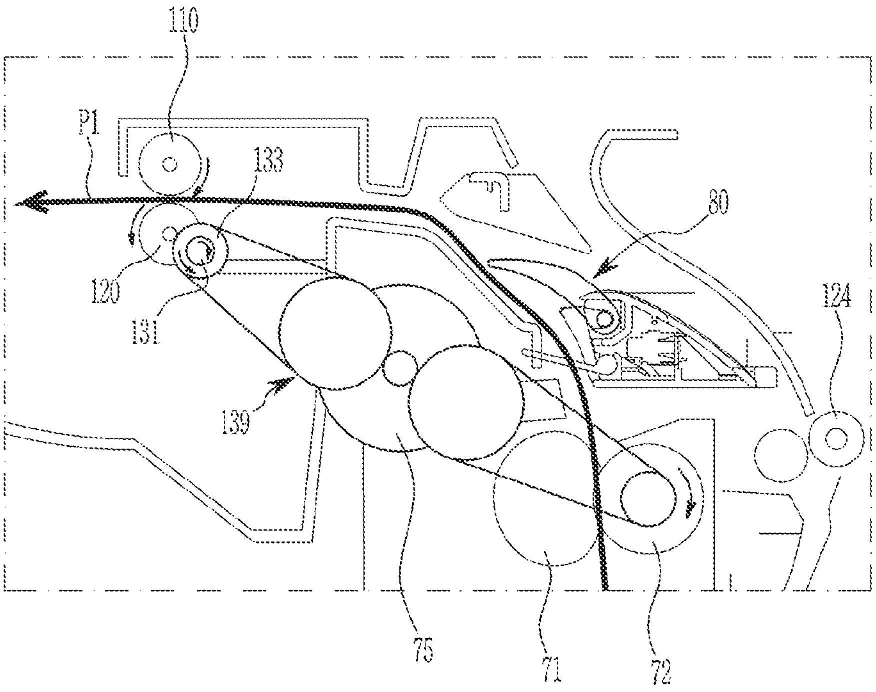
FIG. 10 to FIG. 16 are drawings for explaining an operation of an image forming apparatus according to an example.

FIG. 9 is a flowchart illustrating a method of controlling an image forming apparatus according to an example. FIG. 10 to FIG. 16 are drawings for explaining an operation of an image forming apparatus according to an example.

As shown in FIG. 9, when the sensor 77 detects the printing medium P with the image formed on one surface passing through the fixing unit 70, the controller 200 operates the discharge motor 101 such that the first roller 110 is rotated in a first direction (e.g., clockwise direction) for a first predetermined time at operation S10. Hereinafter, the printing medium P in which the image is formed on one surface passing through the simplex path S and moving to the duplex path will be referred to as a first printing medium P1.

Here, the first direction refers to a direction in which the printing medium P is conveyed to the discharge port 90 from the simplex path 5, and the first roller 110 is rotated clockwise. When the first roller 110 is rotated in the clockwise direction, the second roller 120 is cooperatively rotated with the first roller 110, and thus the second roller 120 is rotated in the counterclockwise direction. Accordingly, the first printing medium P1 conveyed from the simplex path S is inserted between the first roller 110 and the second roller 120 of the discharge unit 100 (see FIG. 10). At this time, a part of an end of the first printing medium P1 is discharged to the discharge unit 100 and a part of the middle of the first printing medium P1 remains engaged between the first roller 110 and the second roller 120.

As such, when one sheet of printing medium P is interposed between the first roller 110 and the second roller 120, since the friction coefficient applied between the second roller 120 and the printing medium P is large, the external torque applied to the outer race 133 of the torque limiter 130 is greater than the operation torque applied between the inner race 131 and the outer race 133 of the torque limiter 130. Accordingly, the second roller 120 is cooperatively rotated with the first roller 110.

Figure 11:
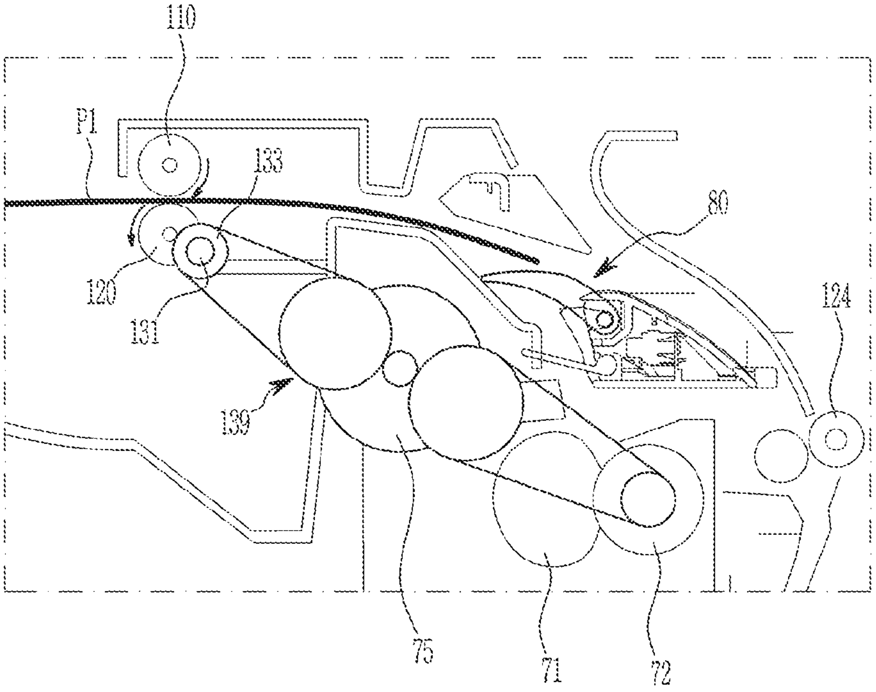

Before the first printing medium P1 is conveyed to the duplex path D, the controller 200 controls the discharge motor 101 to be stopped for a predetermined time so that the first roller 110 is stopped at operation S20 (see FIG. 11). As described above, when the first roller 110 is stopped, since the friction coefficient applied between the second roller 120 and the first printing medium P1 is large, the second roller 120 is cooperatively stopped with the first roller 110.

Figure 12:
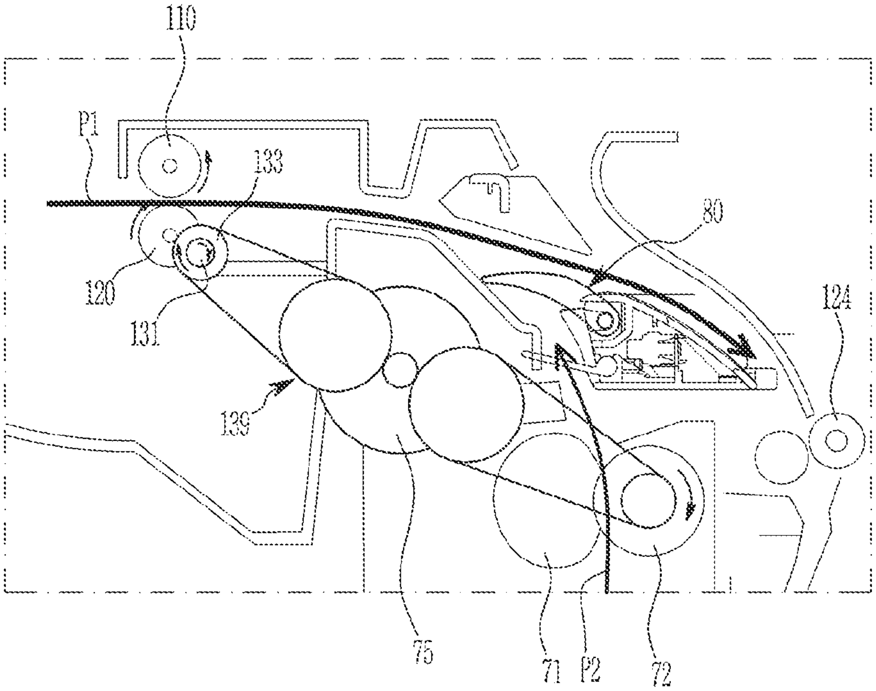
Figure 13:
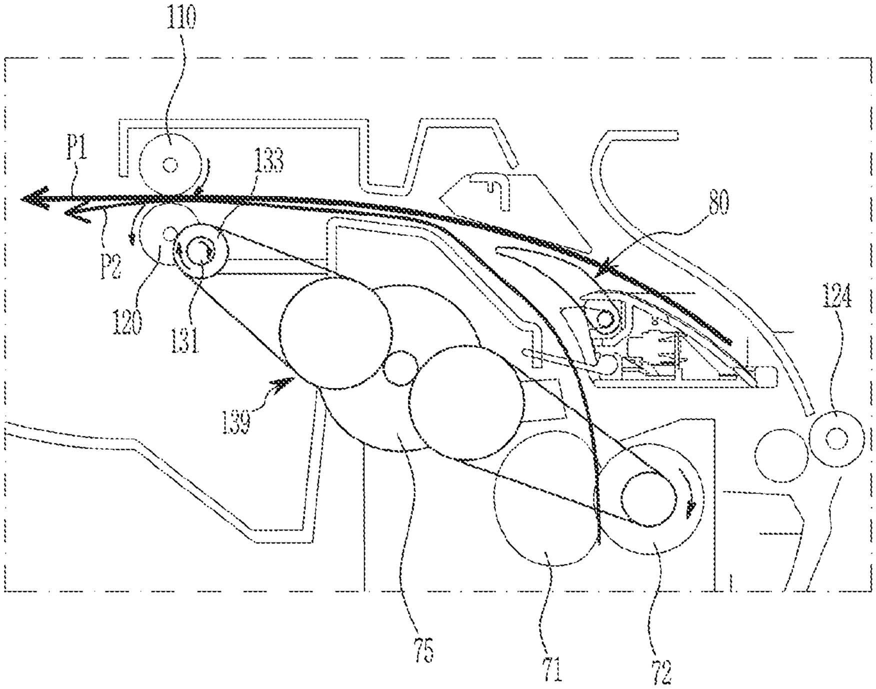

In order to convey the first printing medium P1 to the duplex path D, the controller 200 controls the discharge motor 101 so that the first roller 110 is rotated in a second direction (e.g., counterclockwise) at operation S30 (see FIG. 12). As in operation S10, when the first roller 110 is rotated in a counterclockwise direction, the second roller 120 is rotated in a clockwise direction in association with the first roller 110. Accordingly, the first printing medium P1 is conveyed to the duplex path from the discharge port 90.

Here, the printing medium P on which the image is formed on both surfaces while passing through the simplex path S again after passing through the simplex path S and the duplex path will be referred to as a second printing medium P2. Prior to the first printing medium P1, in order to discharge the second printing medium P2 to the discharge port 90, the controller 200 may control the discharge motor 101 to be stopped for a predetermined time at operation S40. In this case, the first printing medium P1 remains engaged between the first roller 110 and the second roller 120.

When the sensor 77 detects that the second printing medium P2 passes through the fixing unit 70, the controller 200 controls the discharge motor 101 so that the first roller 110 is rotated in the first direction (e.g., clockwise direction) for a predetermined time at operation S50. When the first roller 110 is rotated in the clockwise direction, the second roller 120 is cooperatively rotated with the first roller 110, and thus the second roller 120 is rotated in the counterclockwise direction. Accordingly, the first printing medium P1 and the second printing medium P2 are inserted between the first roller 110 and the second roller 120 of the discharge unit 100.

When the first printing medium P1 and the second printing medium P2 are drawn between the first roller 110 and the second roller 120, two sheets of printable media P1 and P2 are conveyed between the first roller 110 and the second roller 120 by the second roller 120 rotating in conjunction with the first roller 110. Then, the first printing medium P1 is in contact with the first roller 110 rotated in the clockwise direction by the discharge motor 101 and conveyed to the discharge port 90. Further, since slip occurs between the two sheets of printable media P1 and P2, the second roller 120 is rotated in the counterclockwise direction in association with the inner race 131 of the torque limiter 130 rotated in the clockwise direction by the fixing motor 75. Accordingly, the second printing medium P2 is in contact with the second roller 120 and conveyed to the discharge port 90. At this time, the first printing medium P1 is positioned at an upper side of the second printing medium P2, the first printing medium P1 is in contact with the first roller 110, and the second printing medium P2 is in contact with the second roller 120. That is, the first printing medium P1 and the second printing medium P2 are kept engaged between the first roller 110 and the second roller 120 (see FIG. 13).

After the first printing medium P1 and the second printing medium P2 are inserted between the first roller 110 and the second roller 120, in order to convey the first printing medium P1 to the duplex path D and discharge the second printing medium P2 to the discharge port 90, the controller 200 controls the discharge motor 101 so that the first roller 110 is rotated in the second direction (e.g., counterclockwise) for a predetermined time at operation S60.

In this case, the first printing medium P1 and the second printing medium P2 are inserted between the first roller 110 and the second roller 120, Since the friction coefficient between the two sheets of printable media P1 and P2 is very small compared to the friction coefficient between the rollers 110 and 120 and the printable media P1 and P2, the external torque applied to the outer race 133 of the torque limiter 130 connected to the second roller 120 becomes small compared to the operation torque of the torque limiter 130. Accordingly, the second roller 120 is rotated in the counterclockwise direction in association with the inner race 131 rotated in the clockwise direction.

Figure 14:
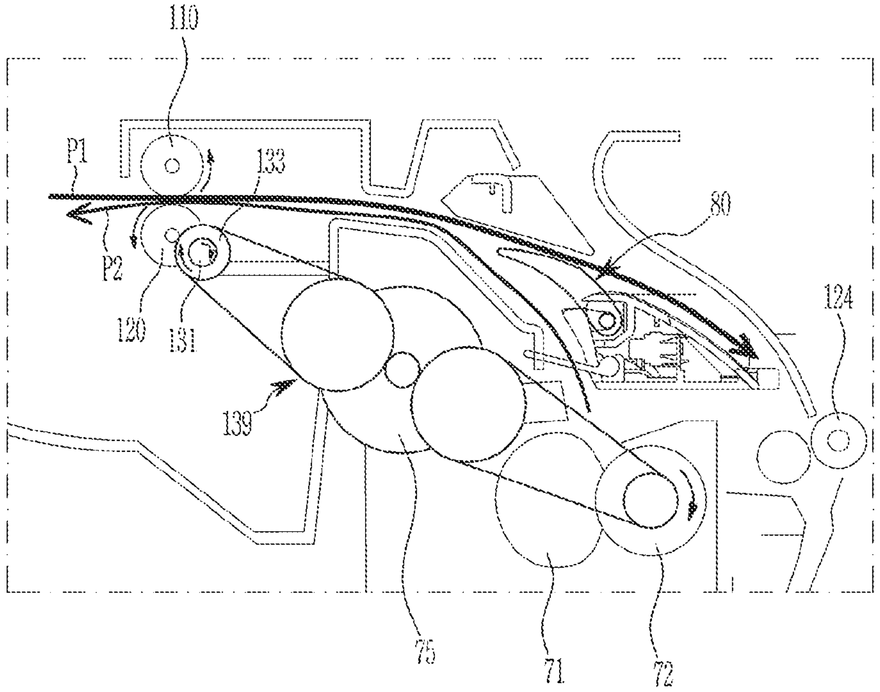
Figure 15:
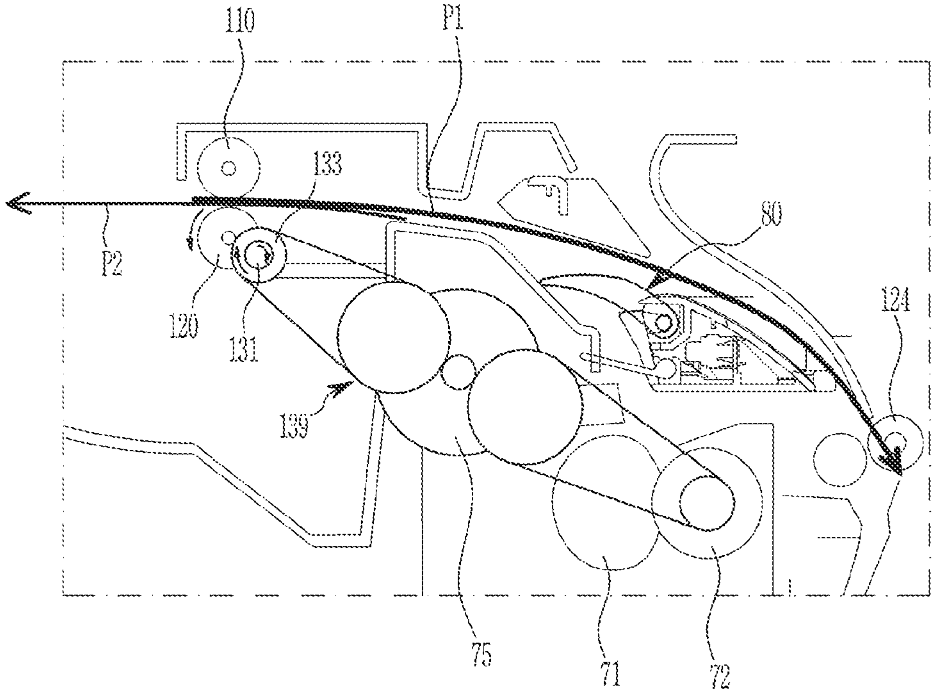
Figure 16:
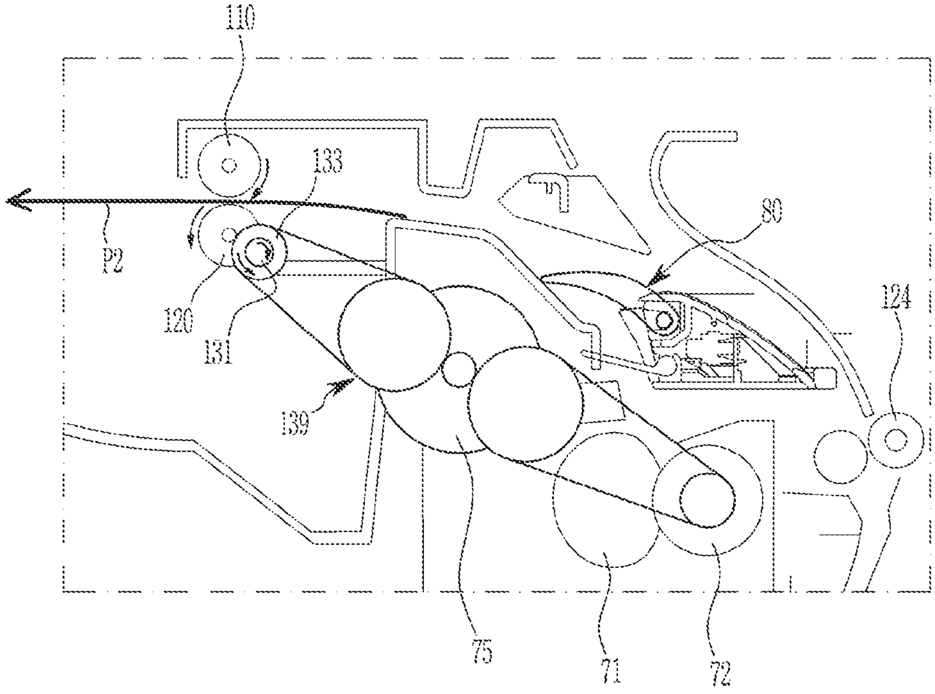

When the first roller 110 is rotated in the counterclockwise direction, the first printing medium P1 in contact with the first roller 110 is conveyed to the duplex path D from the discharge port 90 according to the rotation of the first roller 110, and the second printing medium P2 in contact with the second roller 120 is discharged to the discharge port 90 from the simplex path S (see FIG. 14).

At operation S60, when the first roller 110 is rotated in the second direction (e.g., counterclockwise) for a predetermined time, a front end of the first printing medium P1 enters between the duplex rollers 124 on the duplex path D. The controller 200 controls the discharge motor 101 to be stopped such that the first roller 110 is stopped for a predetermined time at operation S70. Although the discharge motor 10 is stopped, since the first printing medium P1 is engaged between the duplex rollers 124, the first printing medium P1 is conveyed to the duplex path D by the rotation of the duplex rollers 124. The second roller 120 is rotated in the counterclockwise direction in association with the inner race 131 rotated in the clockwise direction, and the second printing medium P2 in contact with the second roller 120 is conveyed to the discharge port 90 according to the rotation of the second roller 120 (see FIG. 15).

After the first printing medium P1 is completely discharged into the duplex path D, the controller 200 controls the discharge motor 101 such that the first roller 110 is rotated in the first direction (e.g., clockwise) at operation 580. When the first roller 110 is rotated in the clockwise direction, the second roller 120 is rotated in the counterclockwise direction in association with the first roller 110. Accordingly, the second printing medium P2 engaged between the first roller 110 and the second roller 120 is completely discharged to the discharge port 90 from the simplex path S (see FIG. 16).

As described above, when the two sheets of printable media P1 and P2 are engaged between the first roller 110 and the second roller 120, the first printing medium P1 and the second printing medium P2 may be conveyed in the different directions as the first roller 110 rotates in the counterclockwise direction. However, if a middle part of the first printing medium P1 and a rear end of the second printing medium P2 are engaged between the first roller 110 and the second roller 120, an abnormal operation may occur in which the second printing medium P2 is not conveyed to the discharge port 90 and is conveyed to the duplex path D along the rotational direction of the first roller 110. Therefore, the first printing medium P1 is stopped for the predetermined time by temporarily stopping the first roller 110, and the second printing medium P2 is discharged to the discharge port 90 by the rotation of the second roller 120. Thereafter, by operating the first roller 110 to transfer the first printing medium P1 to the duplex path D, it is possible to prevent an abnormal operation from occurring.

While examples of the invention have been described, it is to be understood that the invention is not limited to the disclosed examples. On the contrary, it is intended to cover various modifications and equivalent arrangements included within the spirit and scope of the appended claims.

What is claimed is:

1. An image forming apparatus comprising:

a main body including a discharge port;

a fixing unit mounted inside the main body to fix an image onto a printing medium;

a simplex path to convey printing medium passing through the fixing unit to the discharge port;

a duplex path to turn over printing medium passing through the simplex path and to convey the printing medium to the simplex path; and a discharge unit in the discharge port to selectively convey a first printing medium and a second printing medium in different directions, wherein the discharge unit includes:

a first roller provided in the discharge port to selectively rotate in a first direction and a second direction; and a second roller positioned opposite to the first roller, wherein a rotational direction of the second roller is based on a number of printable media interposed between the first roller and the second roller;

wherein the first printing medium includes an image formed on one surface and passing through the simplex path, and the second printing medium includes an image formed on two surfaces and passing through the simplex path after passing through the duplex path.

2. The image forming apparatus of claim 1, further comprising a torque limiter including:

a first rotation body to rotate in one direction; and a second rotation body to rotate in a same direction as the first rotation body or an opposite direction to the first rotation body, wherein a rotational direction of the second rotation body is based on a number of printable media interposed between the first roller and the second roller and a magnitude of an external torque applied to the second rotation body, and wherein the second roller is rotatably connected to the second rotation body.

3. The image forming apparatus of claim 2, wherein the second rotation body is rotated in the same direction as the first rotation body when the external torque applied to the second rotation body is less than an operation torque between the first rotation body and the second rotation body, and wherein the second rotation body is rotated in the opposite direction to the first rotation body when the external torque applied to the second rotation body is greater than the operation torque between the first rotation body and the second rotation body.

4. The image forming apparatus of claim 3, wherein the torque limiter further includes:

a first magnet provided in the first rotation body; and a second magnet provided in the second rotation body, wherein an operation torque is generated by a magnetic force between the first magnet and the second magnet.

5. The image forming apparatus of claim 3, wherein the torque limiter further includes a spring provided between the first rotation body and the second rotation body, and wherein an operation torque is generated by an elastic force by the spring.

6. The image forming apparatus of claim 5, wherein the spring is wound around an inner race in a direction that tightens the inner race, wherein one end of the spring is hooked to a first protrusion formed in an interior circumference of an outer race, and wherein another end of the spring is hooked to a second protrusion formed in the interior circumference of the outer race.

7. The image forming apparatus of claim 5, wherein one end of the spring is fixedly installed to an inner race, another end of the spring is a free end, and the spring is wound so that a diameter of the spring is increased corresponding to a rotational direction of the inner race.

8. The image forming apparatus of claim 2, wherein the first rotation body is rotatably connected to a fixing motor operating a pressure roller of the fixing unit.

9. An image forming apparatus comprising:

a sensor disposed in a simplex path to detect a printing medium passing through a fixing unit;

a torque limiter including:

a first roller rotatable in two directions, a second roller provided opposite to the first roller, a first rotation body rotatable in one direction, and a second rotation body rotatably connected to the second roller and rotatable in a same direction as or an opposite direction to the first rotation body in order to selectively convey a first printing medium with an image formed on one surface in the simplex path and a second printing medium with an image formed on another surface in the simplex path after passing through a duplex path in different directions; and a controller to:

control a rotating direction of the first roller based on a signal of the sensor, operate the first roller to be rotated in a first direction for a first predetermined time such that the first printing medium is inserted between the first roller and the second roller when it is detected that the first printing medium passes through the fixing unit by the sensor, operate the first roller to be rotated in a second direction for a second predetermined time such that the first printing medium is conveyed to the duplex path, operate the first roller to be rotated in the first direction such that the second printing medium is inserted between the first roller and the second roller when it is detected that a second printing medium passes through the fixing unit by the sensor in a state where the first printing medium is inserted between the first roller and the second roller, and operate the first roller to be rotated in the second direction such that the first printing medium in contact with the first roller is conveyed to the duplex path, and the second printing medium in contact with the second roller is discharged to a discharge port.

10. The image forming apparatus of claim 9, wherein the controller is to operate the first roller to be stopped for a predetermined time before the first printing medium engaged between the first roller and the second roller is conveyed to the duplex path.

11. The image forming apparatus of claim 10, wherein the controller is to:

operate the first roller to be stopped for a predetermined time in a state where the first printing medium and the second printing medium are inserted between the first roller and the second roller, and operate the first roller to be rotated in the first direction after the first roller is stopped for the predetermined time.

12. A method of controlling an image forming apparatus, the method comprising:

operating a first roller to be rotated in a first direction for a predetermined time such that a first printing medium with an image formed on one surface passing through a simplex path is inserted between the first roller and a second roller provided in a discharge port;

operating the first roller to be rotated in a second direction opposite to the first direction for a predetermined time so that the first printing medium is conveyed to a duplex path;

operating the first roller to be rotated in the first direction in a state where the first printing medium is engaged between the first roller and the second roller; and operating the first roller to be rotated in the second direction after the first printing medium and a second printing medium are inserted between the first roller and the second roller.

13. The method of claim 12, further comprising operating the first roller to be stopped for a predetermined time before the first printing medium engaged between the first roller and the second roller is conveyed to the duplex path.

14. The method of claim 12, further comprising:

operating the first roller to be stopped for a predetermined time in a state where the first printing medium and the second printing medium are inserted between the first roller and the second roller; and operating the first roller to be rotated in the first direction after the first roller is stopped for the predetermined time.

* * * * *